United States Patent [19]

Wechselberger et al.

[11] Patent Number: 4,531,020
[45] Date of Patent: Jul. 23, 1985

[54] MULTI-LAYER ENCRYPTION SYSTEM FOR THE BROADCAST OF ENCRYPTED INFORMATION

[75] Inventors: Anthony J. Wechselberger, San Diego; Leo I. Bluestein, Rancho Bernardo; Leo Jedynak, San Diego; David A. Drake, Escondido; Larry W. Simpson, Poway, all of Calif.

[73] Assignee: Oak Industries Inc., Rancho Bernardo, Calif.

[21] Appl. No.: 401,258

[22] Filed: Jul. 23, 1982

[51] Int. Cl.³ .............................................. H04K 1/02
[52] U.S. Cl. .................................. 178/22.08; 358/122; 358/123
[58] Field of Search .... 178/22.08, 22.09, 22.13–22.16; 375/2.2; 455/26–28; 358/114, 122, 123

[56] References Cited

U.S. PATENT DOCUMENTS

| | | | |
|---|---|---|---|
| 4,193,131 | 3/1980 | Lennon et al. | 178/22.08 |
| 4,203,166 | 5/1980 | Ehrsam et al. | 178/22.09 |
| 4,288,659 | 9/1981 | Atalla | 178/22.08 |
| 4,292,650 | 9/1981 | Hendrickson | 358/114 |
| 4,323,921 | 4/1982 | Guillou | 358/114 |
| 4,337,483 | 6/1982 | Guillou | 358/114 |
| 4,348,696 | 9/1982 | Beier | 358/114 |
| 4,354,201 | 10/1982 | Sechet et al. | 358/114 |
| 4,388,643 | 6/1983 | Aminetzeh | 358/114 |
| 4,460,922 | 6/1984 | Ensinger et al. | 358/114 |
| 4,464,678 | 8/1984 | Schiff et al. | 358/122 |

FOREIGN PATENT DOCUMENTS

| | | | |
|---|---|---|---|
| WO81/02961 | 10/1981 | PCT Int'l Appl. | 358/122 |
| WO83/01881 | 5/1983 | PCT Int'l Appl. | 358/122 |

Primary Examiner—Salvatore Cangialosi
Attorney, Agent, or Firm—Kinzer, Plyer, Dorn & McEachran

[57] ABSTRACT

A method of controlling the simultaneous broadcast of enciphered digital information signals, for example in a radio or television broadcast environment, to a plurality of subscribers provides several levels of enciphering keys. The broadcast digital information signal is in a broadcast common service enciphering key and communication between the transmitter and subscribers may take place in a box key or in a group enciphering key common to a group of subscribers having a common interest in the reception of broadcast signals of a particular type. Each receiver will decipher the broadcast digital information in a specific service key which is common to that broadcast. The service key may be changed at one or more subscribers by communicating the change in the service key to the subscribers by means of the group enciphering key. Further, the group enciphering key may be changed at one or more subscribers or new groups may be formed among subscribers by communicating to the subscribers in one or more group enciphering keys.

5 Claims, 3 Drawing Figures

| COMMAND TYPE | RCVR-GROUP ID | NEW GROUP KEY | NEW GROUP ID | MISC. INFO. |
|---|---|---|---|---|

| COMMAND TYPE | RCVR-GROUP ID | NEW SERVICE KEY | MISC. INFO. |
|---|---|---|---|

Fig.3.

TYPICAL MESSAGE STRUCTURE

MULTI-LAYER ENCRYPTION SYSTEM FOR THE BROADCAST OF ENCRYPTED INFORMATION

SUMMARY OF THE INVENTION

The present invention relates to a system for enciphering and deciphering digital information signals and has application in the field of broadcast television, although the principles disclosed herein should not be so limited. Specifically, audio information and/or text information for display on a video screen may be placed in digital form and enciphered. Such signals may be part of a cable television system (CATV), a subscription television system (STV) or a direct broadcast satellite television system (DBS).

A primary purpose of the invention is a system for enciphering digital information signals in the environment described in which there are multiple layers of enciphering keys to insure security of the broadcast information.

Another purpose is an enciphering and deciphering system of the type described in which communication between the broadcast station and a plurality of subscribers may take place in a box key peculiar to an individual subscriber, a group key peculiar to a group of subscribers having a common interest, or in a service key which is common for a specific broadcast and which may be changed from time to time through either the group or box keys.

Another purpose is a simply reliable and completely secure enciphering and deciphering system for use in the broadcast of digital information signals.

Another purpose is a method for controlling the broadcast of digital information signals in which there are layers or levels or tiers of keys to insure system security and in which the keys may be changed by communication to subscribers in one or more of the layers of keys.

Other purposes will appear in the ensuing specification, drawings and claims.

BRIEF DESCRIPTION OF THE DRAWINGS

The invention is illustrated diagrammatically in the following drawings wherein:

FIG. 3 is a diagrammatic illustration of typical message structures used in the system disclosed herein.

DESCRIPTION OF THE PREFERRED EMBODIMENT

Figure 1:
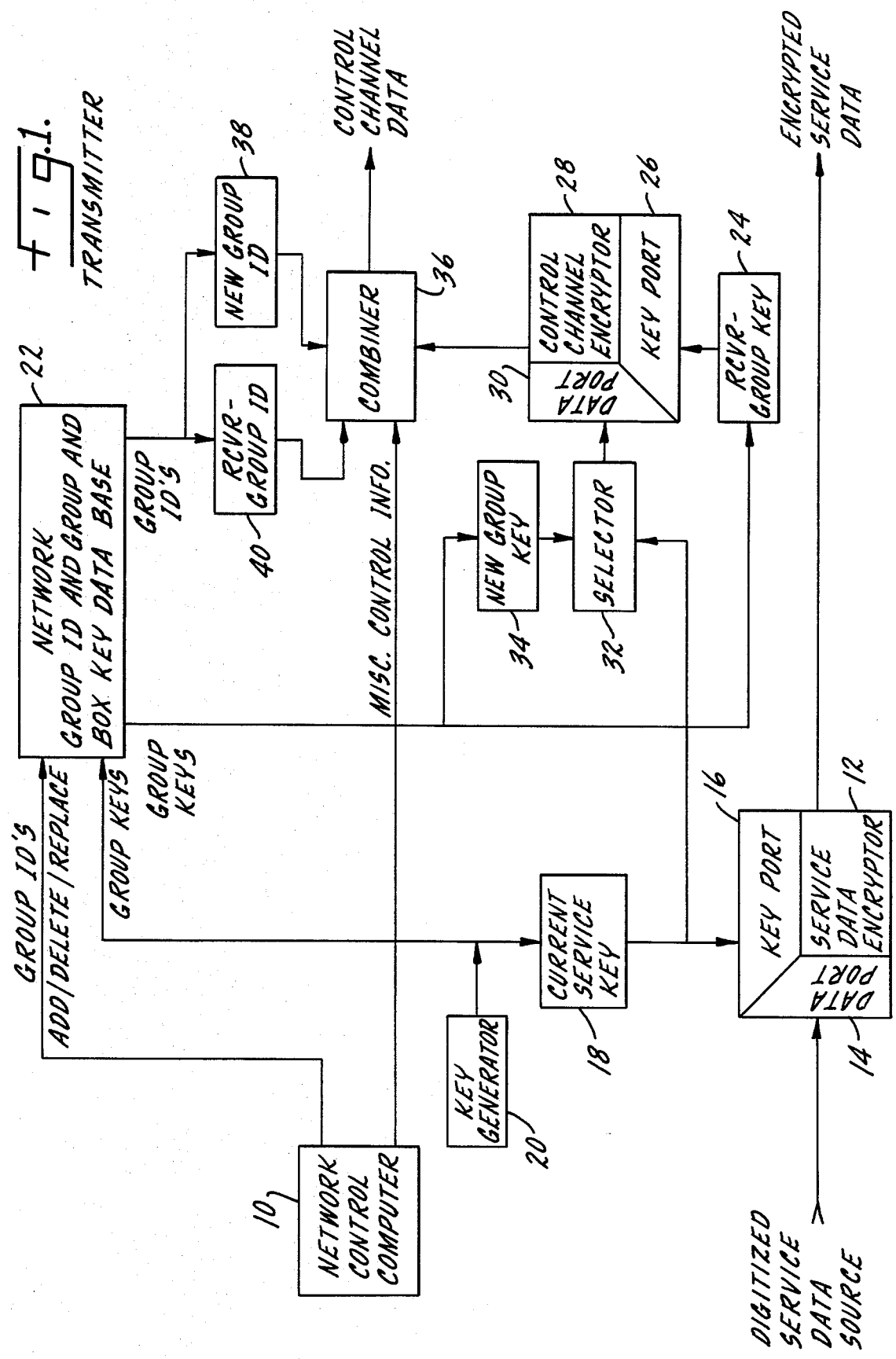
FIG. 1 is a block diagram of a transmitter for use in the control system described herein.

The present invention has utility in CATV, STV and DBS television systems in which the video signal is coded. The specific enciphering and deciphering system disclosed herein is primarily applicable to the audio portion of the video signal as the audio signal is readily susceptible of being placed in a digital format. It is also applicable to those video signals in which alphanumeric text information is transmitted, such as the VIDEO-TEXT system now in commercial use by Oak Industries Inc., assignee of the present application or other types of digital or digitized data such as computer software, games, radio programs, computer data bases, etc. which may be delivered via such communication system. Signals of that type are also readily susceptible to being placed in digital form and hence can be enciphered and deciphered by the control system described herein.

It is important in broadcast systems of the type referred to above to insure secrecy or privacy of the communications, as customarily such broadcasts are on a subscription basis and it is mandatory that privacy be retained or the concept of a subscription broadcast system is destroyed. To that end various schemes have been proposed to insure the security of those portions of the signals which can be placed in digital form. The present invention provides a first level of security by enciphering the digital information signals in what is termed a service key, which key is provided to all subscribers who are to receive a specific broadcast or a specific type of broadcast. For example, the service key may be peculiar to a specific program, but more commonly it will be used for a specific channel when the system is used in a television environment. To insure privacy and security the service key must be periodically changed. To change the service key it is necessary to communicate with each of the subscribers and this communication takes place in what is called the group key which is common to a group of subscribers, all of whom are to receive a specific type of broadcast. There may be a substantial number of groups associated with a specific communication system and an individual subscriber may itself belong to more than one or a plurality of groups. Specifically, to change the service key for a particular type of broadcast, the broadcaster will communicate to all of the subscribers in the group key and the group key is used to change the service key. As an alternative, a large number of service keys may be stored in each decoder and the broadcast station selects a specific service key by communicating with the subscriber in the group key.

From time to time subscribers' tastes and desires in programming change and thus it is necessary to change groups, to reform groups and to add or delete subscribers from a particular group. Again, this may be accomplished by communicating to the subscribers in the group key. The group key itself may be changed and subscribers may be added or deleted from the group, or in fact new groups may be formed by communicating to the subscribers in the group key.

In addition to communicating in the group key, it is necessary to have addresses which are peculiar to an individual subscriber and peculiar to a group. For example, each subscriber may have its own individual address which is peculiar to that subscriber. That address will be stored in the subscriber's decoder. In addition, the subscriber may belong to one or more groups, each of which will have a specific address for that group with these addresses being temporarily stored in the subscribers decoder. Thus, the broadcaster may communicate to the subscriber by providing the subscriber's group address or the subscriber's individual address and by communicating to the subscriber in the group key peculiar to the group with which the broadcaster is specifically concerned at that moment.

As a final means for insuring security and privacy, each subscriber will have what is known as a box key and that is a key peculiar to a specific subscriber. If the broadcaster wishes to communicate in complete privacy with an individual subscriber, it may do so in the subscriber's box key. For example, if the broadcaster feels that one or more groups of keys have been compromised and the only way to reform groups is to communicate to each individual subscriber in its box key, the broadcaster may do so, although this may be a time consuming operation taking several hours. In any event, by having a hard-wired box key available in each subscriber's box, the broadcaster may communicate to each individual subscriber in that specific key to provide changes in group keys or formation of new groups, etc. In the general sense, there need not be a logical distinction between group keys and box keys, or group addresses and box addresses. The box address/box key pair simply constitutes another subscriber subset (group) to which there happens to be only a single member.

There are normally two channels of communication between the broadcaster and the subscribers. The service channel provides the digital information signals and these are enciphered in the service key. The other channel is the control channel necessary to change service keys, change or reform group keys, etc., and this channel may be independent of the channel carrying the digital information signals, or it may be inserted into gaps in the service channel. For example, in a television environment the service channel may be at aural carrier frequencies and the control channel may be on an alternate FM frequency. Another system provides that the control channel is inserted as data in the vertical or horizontal blanking intervals of the accompanying video signal.

In FIG. 1 the network control computer is indicated at 10 and will normally be programmed to handle all of the functions of the overall control system as described. A service data encryptor 12 receives digitized service data at its data port 14. This may be digitized audio or text information as described above. The current service key is provided at key port 16 from a current service key source 18. A key generator 20 will provide a constant supply of enciphering keys. Key generator 20 provides keys to the service key source 18 and also to a network group identification and group and box key data base 22. Computer 10 also provides an input to data base 22 so that group identifications may be added or changed or replaced.

One output from data base 22 goes to a receiver group key source 24 which provides the input for key port 26 of control channel encryptor 28. Data port 30 of encryptor 28 receives its input from a selector 32 which in turn receives one input from service key source 18 and a second input from a new group key source 34. Thus, the selector provides either a change in service key or a change in group key to the data port of the control channel encryptor, which data will be encoded in the then current group key for transmission to combiner 36. Combiner 36 will be connected to a modulator which will provide a modulated signal appropriate for the particular communication medium, e.g., CATV, STV or DBS.

An additional input to combiner 36 comes directly from network control computer 10 and will provide miscellaneous control information such as error correction, etc.

In addition to the encrypted key information which is a part of a control message, each message includes identification numbers or addresses peculiar to a subscriber or to a group. This information is provided by data base 22 to combiner 36 through a new group identification 38 which is utilized when a group ID is to be changed or through a receiver group identification 40 which is utilized when a particular group is to be addressed.

FIG. 3 illustrates typical control messages which may be sent by combiner 36 as the control channel data. In the upper message there will be, as the first field of a message various command and control signals peculiar to the protocol of the specific system. The next field of the message is the receiver group identification or address of all of the subscriber boxes in a particular group which are to receive the message. This is necessary to inform the subscriber boxes that a message is on the way. Assuming that a new group key is to be provided, that will be the next field of the message and that information will be encrypted in the current group key. If a new group identification or address is to be provided because the group is being changed or reformed in some manner, then that information will also be provided, however, it need not be in encrypted form. Finally, the message will conclude with such miscellaneous command information as error correction, etc.

A second type of message structure is indicated in the lower portion of FIG. 3 and in this case differs from the top message in that a new service key is provided to all of the members of the group. This specific service key is encrypted in the then current group key.

Figure 2:
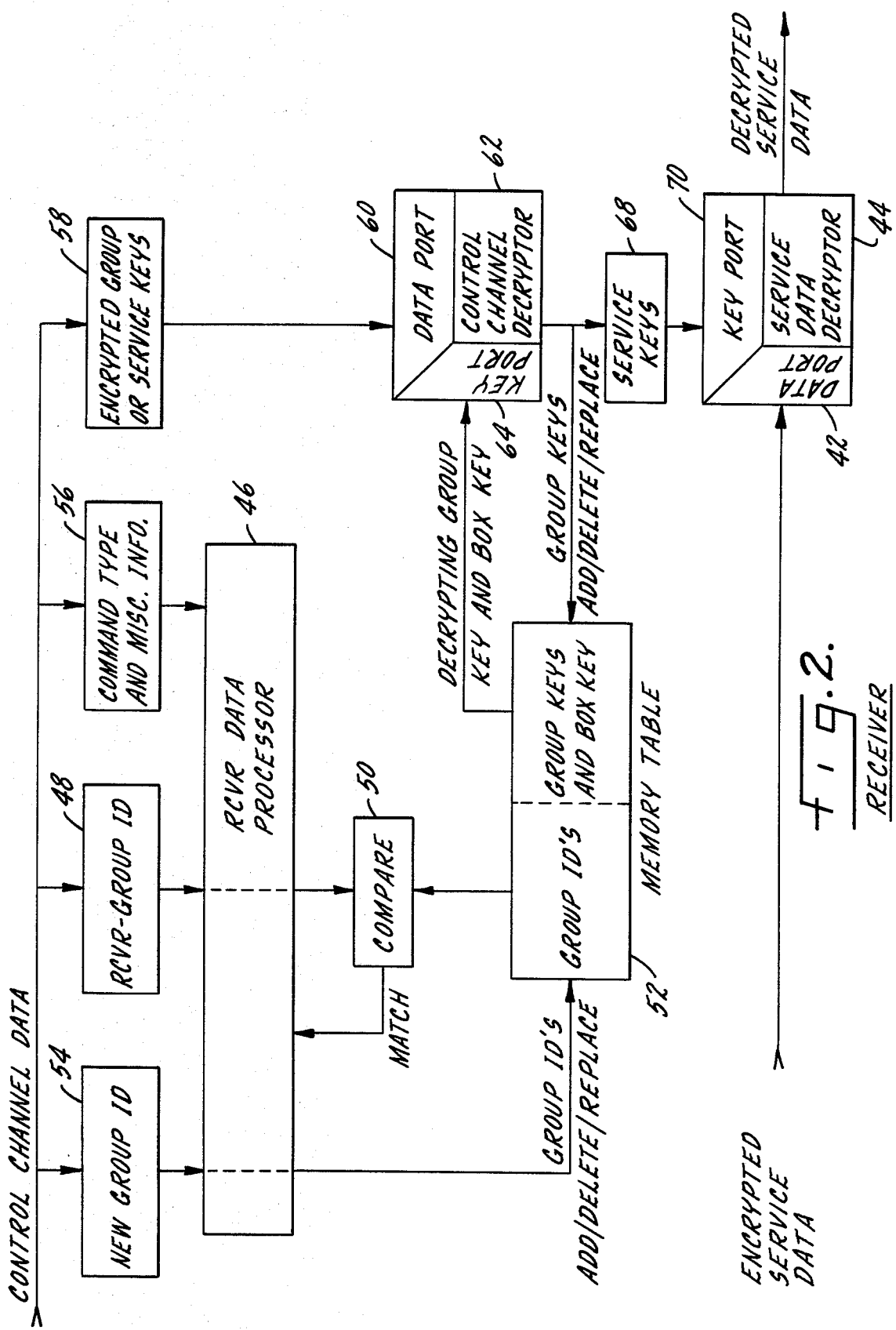
FIG. 2 is a block diagram of the receiver.

A typical receiver is illustrated in FIG. 2. The encrypted service data is provided on the service channel and provides an input for data port 42 of service data decryptor 44. The output will be the decrypted service data.

The control channel data is directed to a receiver data processor 46 in which the receiver group identification field, routed through a selection circuit 48, will pass through the processor and be compared in a comparison circuit 50 with the group identification stored in a memory table or memory storage means 52. Assuming that the particular subscriber is to receive the message on the control channel, data processor 46 will be enabled which in turn will cause the memory table to provide the required key information to the decryptors.

If a new group identification is to be provided, receiver data processor 46 will pass this information, which is separated by a new group ID selection circuit 54, directly to the group identification portion of the memory table so that the group ID may be changed in the required manner.

The command information is passed directly through a separating circuit 56 to the receiver data processor, to perform a portion of the enabling function to permit the processor to handle the group identification address or a change in group identification address, as required in accordance with a specific message. Thus, the group identification which may be peculiar to a single subscriber or peculiar to one of the groups to which the subscriber belongs, is stored in memory table 52 and may be changed periodically as the tastes and requirements of a specific subscriber change.

The encrypted key portion of a control channel message is separated by encrypted group or service key detector 58 and is sent directly to data port 60 of control channel decryptor 62. The key port of decryptor 62, indicated at 64, is connected to the group and box key portion of the memory table. Thus, when enabled by data processor 46, the required key will be drawn from the memory and provided at the key port of control channel decryptor 62. In this connection, the memory table may be a non-volatile storage area for the collection of the group identifications and the group keys resident within the box. The permanent box key for a specific subscriber box is permanently stored in the memory table and is not subject to revision or change.

The output from control channel decryptor 62 which may be a change in service key or a change in group key is connected to the memory table and to the service key source 68 with the output from the service key source being connected to key port 70 of service data decryptor 44. Accordingly, a change in service key is provided to the service data encryptor to decrypt the information bearing signals from the broadcast station. A change in group key is communicated to the memory table so that the group key information may be added to or deleted or changed as requirements dictate.

In a typical broadcast situation, and assuming audio signals as a portion of a subscription television broadcast are the information signals in question, such audio signals will be digitized and encrypted in a specific service key and broadcast on the particular medium whether it be a CATV, STV or DBS system. The service key will be available at each subscriber eligible to receive that broadcast and may be periodically changed as the broadcaster deems necessary to maintain system security. Whenever there is to be a change in the service key, this information is provided through the control channel to all subscribers who are to receive that broadcast. The change in service key is encrypted in the group key peculiar to the group which is to receive the specific broadcast. For example, there may be a group composed of those interested in adult movies, those interested in opera, those interested in specific types of sports programs. The group may be formed of those in a specific geographical area. The number and types of groups are almost infinite and normally each subscriber will be able to belong to a plurality of groups and will have a group key and group ID associated with each such group.

If a specific subscriber desires to belong to a new group, that fact is communicated to the broadcast station and if only a single subscriber is to join the group, the broadcaster may communicate the group ID and group key to that subscriber through the subscriber's individual box key. On the other hand, if a substantial portion of a current group is to be involved in a new group, the broadcaster may address those subscribers to form the new group in the current group key but with the message being preceded by the individual IDs of those particular subscribers. Thus, the broadcaster may form new groups, delete subscribers from a particular group, etc., all by communicating to the subscribers within the concept of the group identification and the group key. Group keys may be changed without a change in the subscribers as from time to time the broadcaster may consider that it is possible that the group key has been compromised.

At times it may be necessary for the broadcaster to communicate individually with all subscribers in the system. Perhaps the broadcaster considers that in some manner the group key concept has been compromised and it is necessary to completely change the group keys throughout the system. In that instance the broadcaster would communicate to each subscriber utilizing the subscriber's individual box key. This would be a time consuming process, for example several hours, and would normally be done in the nighttime hours when there are few if any subscribers watching television programming.

The present system provides great flexibility for the broadcast station. Boxes which are stolen or in the houses of non paying subscribers may be electronically detected or rendered ineffective. Subscribers may select different types of programming. The system is secure in that there are layers or tiers of keys available to the broadcaster for enciphering information and communicating with subscribers.

Although the service data encryptor and control channel encryptor have been described as physically separate, it will be understood by those skilled in the art, that these circuits may be physically the same, but functionally responsive to different instructions to perform both service and control encrypting functions. The same applies to the receiver decryptors.

Whereas the preferred form of the invention has been shown and described herein, it should be realized that there may be many modifications, substitutions and alterations thereto.

The embodiments of the invention in which an exclusive property or privilege is claimed are as follows:

1. A method of controlling the simultaneous broadcast of enciphered digital information signals to a plurality of subscribers in which each subscriber has a permanent box enciphering key; in which the broadcast digital information signal is in a service enciphering key; and in which communication to subscribers may take place in a group enciphering key common to a group of subscribers having a common interest in the reception of broadcast signals of a particular type, including the steps of:
(a) simultaneously broadcasting digital information signals in a specific service key, which digital information signals are deciphered by subscribers having the service key,
(b) changing the service key at subscribers by simultaneously communicating the change in service key to subscribers in at least a portion of a group, such communication being in the group enciphering key,
(c) changing the group enciphering key in at least a portion of the subscribers in a group by communicating such change in the group enciphering key to the selected subscribers in the group, with each communication to a subscriber in the group being preceded by an address to designated subscribers in the group.

2. The method of claim 1 further characterized by and including changing the group key and/or forming a new group of subscribers by communicating to each subscriber, individually and sequentially, a new group key, with such communication to each subscriber being in the subscriber's box key.

3. The method of claim 1 further characterized by and including changing the group key and/or forming a new group of subscribers by communicating to each group of subscribers, in whole or in part, a new group key, with such communication being in group enciphering keys.

4. A receiver for deciphering broadcast digital information signals enciphered in a broadcast common service enciphering key including:
(a) a service data decryptor using a broadcast common service deciphering key to decipher broadcast digital information signals,
(b) memory storage means for retaining an individual subscriber box deciphering key, at least one changeable group deciphering key, and one or more addresses specific to a subscriber and its specified group or groups,
(c) and a control channel decryptor having a control channel input and being connected to said memory storage and service data decryptor, comparison means for determining if a control channel message is addressed to a specific subscriber, said control channel decryptor using the box deciperhing key or a group of deciphering key to decipher a control message as to a change in the service deciphering key or a change in or formation of a group deciphering key.

5. The receiver of claim 4 further characterized by and including a receiver data processor connected to said memory storage means for adding and/or deleting and/or replacing addresses in said memory storage means.

* * * * *